US005573333A

United States Patent [19]

Dahlman

[11] Patent Number: 5,573,333

[45] Date of Patent: Nov. 12, 1996

[54] DEMAND RESPONSIVE, CONTINUOUS PREPARATION OF STARCH SLURRY FOR USE IN MANUFACTURING GYPSUM PRODUCTS

[75] Inventor: Donald P. Dahlman, Lakewood, Calif.

[73] Assignee: National Gypsum Company, Charlotte, N.C.

[21] Appl. No.: 293,445

[22] Filed: Aug. 22, 1994

[51] Int. Cl.[6] .............................. B01F 15/04; G05D 11/06

[52] U.S. Cl. ........................ 366/132; 366/141; 366/152.1; 366/153.1; 366/160.1; 137/4; 137/92

[58] Field of Search .................................... 366/132, 134, 366/141, 151.1, 152.1, 152.2, 153.1, 156.1, 160.1, 160.2, 160.3, 160.5, 162.1, 182.1, 182.2; 137/4, 88, 92; 222/52, 56, 63, 64

[56] References Cited

U.S. PATENT DOCUMENTS

| | | | |
|---|---|---|---|
| 3,161,203 | 12/1964 | Hathorn et al. | 366/152.1 X |
| 3,423,238 | 1/1969 | Weiland | 366/141 X |
| 3,891,366 | 6/1975 | Rushford | 366/151.1 X |
| 3,957,253 | 5/1976 | Barton et al. | 366/132 |
| 4,334,786 | 6/1982 | Delcoigne et al. | 366/152.2 X |
| 4,436,429 | 3/1984 | Strong et al. | 366/132 X |
| 4,445,526 | 5/1984 | Woestman | 137/92 X |
| 4,475,818 | 10/1984 | Bialkowski | 366/152.1 X |
| 4,779,186 | 10/1988 | Handke et al. | 366/152.2 X |
| 5,365,435 | 11/1994 | Stephenson . | |

FOREIGN PATENT DOCUMENTS

| | | |
|---|---|---|
| 390437 | 10/1990 | European Pat. Off. . |
| 5116131 | 5/1993 | Japan . |
| 2091572 | 8/1982 | United Kingdom . |
| 2111038 | 6/1983 | United Kingdom . |
| 2171325 | 8/1986 | United Kingdom . |
| WO95/19221 | 7/1995 | WIPO . |

*Primary Examiner*—Charles E. Cooley
*Attorney, Agent, or Firm*—Marshall, O'Toole, Gerstein, Murray & Borun

[57] ABSTRACT

A system for delivering a proper proportion of water and starch to form a slurry on a continuous basis responsive to the rate required for the production of gypsum board has a water input controller and a starch input controller to control the rate of water and starch input to a mix/hold tank and a starch slurry output controller to control the output of slurry from the mix/hold tank to the gypsum board production line. A programmable logic controller monitors the output rate and density of the delivered slurry, compares them to a target value and signals the input controllers and/or the output controller to adjust the input and output rates accordingly.

37 Claims, 3 Drawing Sheets

DEMAND RESPONSIVE, CONTINUOUS PREPARATION OF STARCH SLURRY FOR USE IN MANUFACTURING GYPSUM PRODUCTS

TECHNICAL FIELD

The present invention relates generally to the production of gypsum board, and more particularly to a system for continuously preparing and delivering a starch slurry for use in a gypsum board production line.

BACKGROUND ART

For the manufacture of gypsum products such as gypsum wallboard, raw gypsum rock is mined, crushed and calcined at about 160°–175° C. During calcination, the gypsum changes from calcium sulfate dihydrate ($CaSO_4 2H_2O$) to calcium sulfate hemihydrate ($CaSO_4 ½ H_2O$), also known as stucco. The calcined rock is crushed to a fine powder.

The gypsum powder is combined with water and starch to form a slurry. Other ingredients, such as fillers and accelerators, may also be added. Upon mixing, the stucco begins rehydrating to its original calcium sulfate dihydrate form. As shown in FIG. 1, gypsum slurry is applied to the top of a bottom paper sheet 14 and forms a gypsum core, and then a top paper sheet 16 is applied over the core. As the slurry sets, dihydrate needles form and interlock with the paper at the core-paper interfaces. As the board 18 moves along the conveyor line 20 in a continuous sheet, the board gains sufficient green strength that it can be cut to standard sizes, turned over and fed into a 600°–800° F. kiln 22.

Once the board 18 is placed inside the kiln 22, there is a severe danger of the needles or crystals recalcining at the core-paper interfaces. This phenomena, called "burning", prevents the paper from firmly adhering to the core and greatly impairs the quality of the finished wallboard. The starch slurry initially added to the gypsum paste is provided to prevent burning. As the temperature rises, the starch migrates to the core-paper interfaces along with steam generated from the excess water expelled from the core in the kiln. The starch forms a wet jelly which serves as a heat sink to protect the crystal needles from recalcining so they maintain a strong interlock with the paper layers.

Gypsum board manufacturers have devised different methods for preparing the starch slurry used in the production of gypsum board. Some manufacturers prepare large quantities of the starch slurry to fulfill a single day's requirement. However, this normally results in the preparation of more starch slurry than is actually used. Since the forms of starch used in the production of gypsum board are relatively costly, this method adds additional expense to the manufacture and overall price of the board. Further, any excess starch slurry must be disposed of. Although starch slurry is non-toxic and can be discarded, it is also edible and provides a food for rats and other vermin. Still further, the excess starch ferments and becomes malodorous.

To overcome these disadvantages, other manufacturers prepare small batches of starch slurry more frequently on a schedule designed to correspond with the requirements of the production process. This system requires careful monitoring of the process and may result in halting production if the starch slurry production is not properly timed. Further, the more frequently batches of starch slurry are prepared, the more likely it becomes that the slurry will vary from batch to batch. This complicates the production of gypsum slurry to the desired specifications and increases the potential for nonuniformity in the finished product.

Still further, an optimum time exists for the starch slurry to hydrate and be used after it is prepared. Often, this time is considerably less than the time required to use all of slurry prepared in the small-batch approach.

Thus, there remains a need for a system to enable gypsum board manufacturers to continuously prepare the proper proportions of water and starch to form a slurry consistent with and responsive to the rate required for admixture with gypsum particles to enable efficient operation of the gypsum wallboard manufacturing equipment and process.

SUMMARY OF THE INVENTION

In accordance with the present invention, a system for delivering a proper proportion of water and starch to form a slurry on a continuous basis responsive to a rate required for the production of gypsum board comprises a supply hopper for storage of dry starch and a mix/hold tank for combining water and starch into a slurry. A water input controller delivers water at an adjustable rate to the mix/hold tank and a starch input controller delivers starch at an adjustable rate from the hopper to the mix/hold tank. A slurry output controller delivers slurry at an adjustable rate and a measurable density from the mix/hold tank to a gypsum board production line.

A control means calculates a difference between an actual slurry output density and a target slurry output density and signals the starch input controller to adjust the starch input rate based on the difference. The control means may also signal the water input controller to adjust the water input rate consistent with the adjusted starch input rate to achieve the target density. Further, the control means monitors the actual slurry output rate, compares it to a target slurry output rate and, if necessary, signals the slurry output controller to adjust the slurry output rate to equal the target rate.

DESCRIPTION OF THE PREFERRED EMBODIMENT

Figure 1:
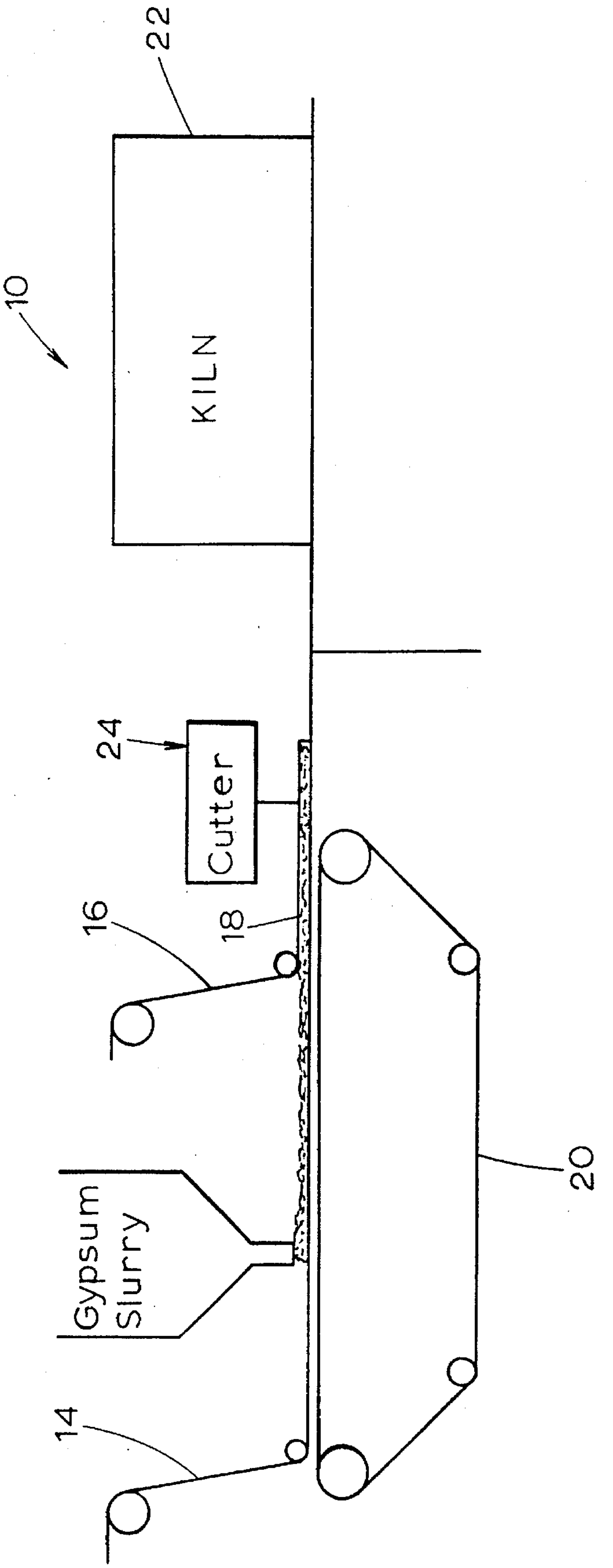
FIG. 1 is a schematic diagram of a gypsum board production line.

FIG. 1 is a schematic depiction of a gypsum board production line 10 in which a gypsum/starch slurry is applied between the bottom paper layer 14 and top paper layer 16 to form the gypsum board 18 as it moves along a conveyor 20. The board 18 is then cut to the desired size by the cutter 24, turned over and fed into a kiln 22. The line 10 may be a conventional type which is well known to those skilled in the art of manufacturing gypsum board. The starch delivery system of the present invention, depicted schematically in FIG. 2, adjusts the starch slurry output (which is mixed with the stucco) according to the rate and density required by the gypsum board production line 10.

Figure 2:
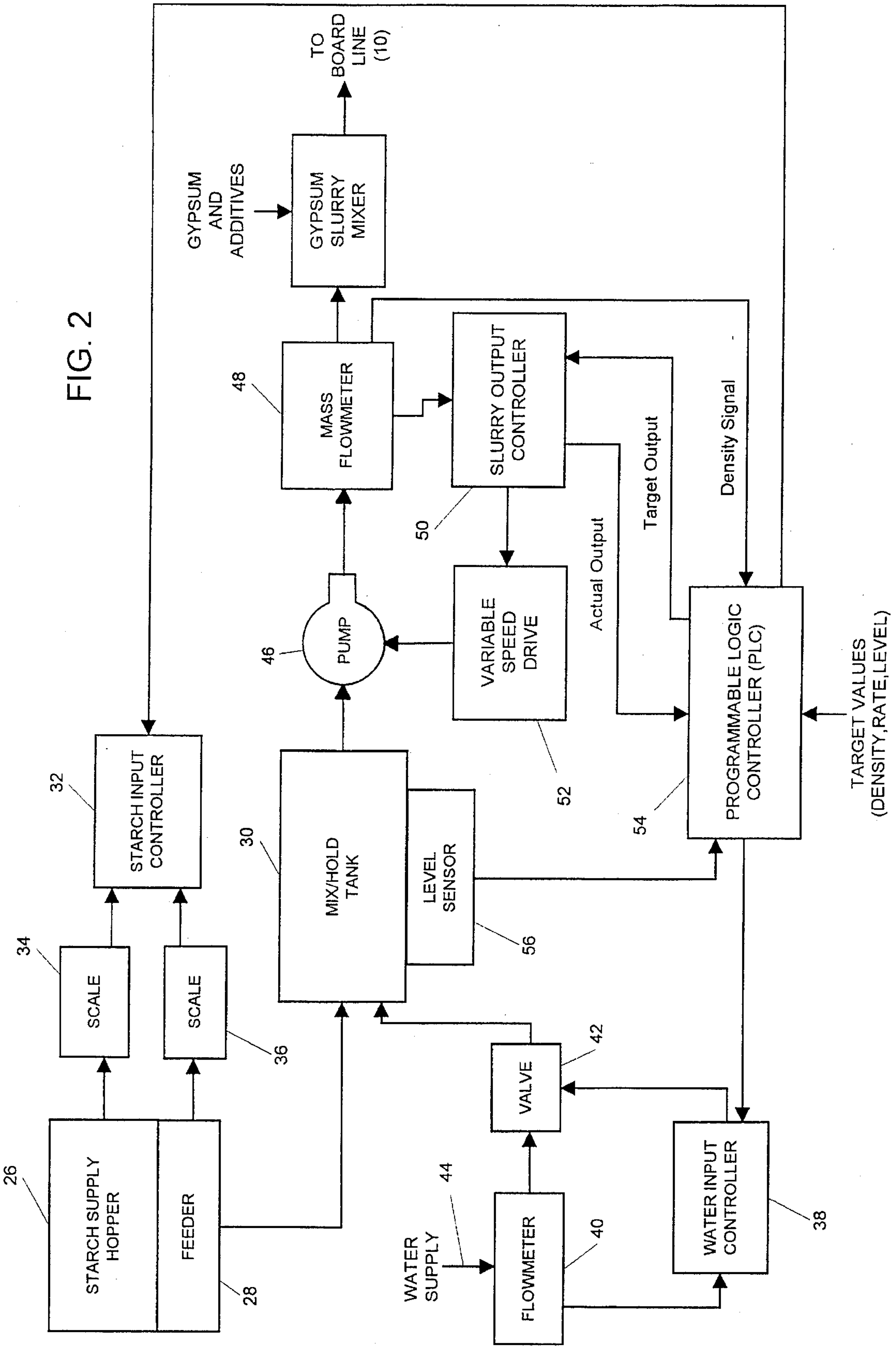
FIG. 2 is a block diagram of the slurry delivery system of the present invention.

Referring to FIG. 2, a starch supply hopper 26 is connected to a feeder 28 which feeds the dry starch into a mix/hold tank 30. The starch used is normally a standard industrial starch, but may also be a food-grade starch. The mix/hold tank 30 may be a 30-gallon plastic tank with a positive displacement type centrifugal pump agitator. The quantity and rate of starch fed from the hopper 26 to the mix/hold tank 30 is controlled by a starch input controller 32, such as a proportional integral derivative controller, connected to the feeder 28.

The feeder 28 can simply be a screw feeder wherein the starch input controller 32 measures the amount of starch fed to the mix/hold tank 30 by counting the number of turns of the screw feeder. However, starch can bridge in the screw feeder and the screw can turn in a tunnel in the starch and the turns-count starch input controller 32 on the feeder 28 will be unable to detect the tunneling and failure to deliver starch to the mix/hold tank 30.

Thus, a preferred embodiment utilizes a weight-in-loss feed system wherein a first scale 34 is attached to the supply hopper 26 and a second scale 36 is attached to the input of the screw feeder 28. Each of the scales 34 and 36 are connected to the starch input controller 32 so that the controller 32 can accurately control and calculate the amount of starch delivered from the hopper 26 to the mix/hold tank 30 over time.

A water input controller 38 is connected between a flowmeter 40 and a valve 42 on a water supply line 44. The flowmeter 40 determines the flow rate of the water and the water input controller 38 controls the valve 42 to input water to the mix/hold tank 30. The water input controller 38 is a proportional integral derivative controller, such as a Honeywell UDC 5000. The water flowmeter 40 is a magnetic-type flow tube and the valve 42 is a linear flow globe/needle-type valve.

An agitator pump inside of the mix/hold tank 30 mixes the water and dry starch into a slurry. The slurry is output from the mix/hold tank 30, combined with gypsum and other additives and delivered to the gypsum board production line 10 via a motor driven pump 46 connected between a mass flowmeter 48 and the mix/hold tank 30. The mass flowmeter 48 measures both the volume and the density of the slurry output. A slurry output controller 50 connected to the mass flowmeter 48 controls a variable speed drive 52 which drives the pump 46 to deliver slurry to the production line 10.

Preferably, the slurry mass flowmeter 48 is a neutron scatter density meter, manufactured by K-Tron, with a magnetic flow tube for flow indication. The slurry output controller 32 is a proportional integral derivative controller, such as a Honeywell UDC 5000. The system also uses an Allen Bradley variable ac drive 52 and a progressive screw-type pump 46.

Figure 3:
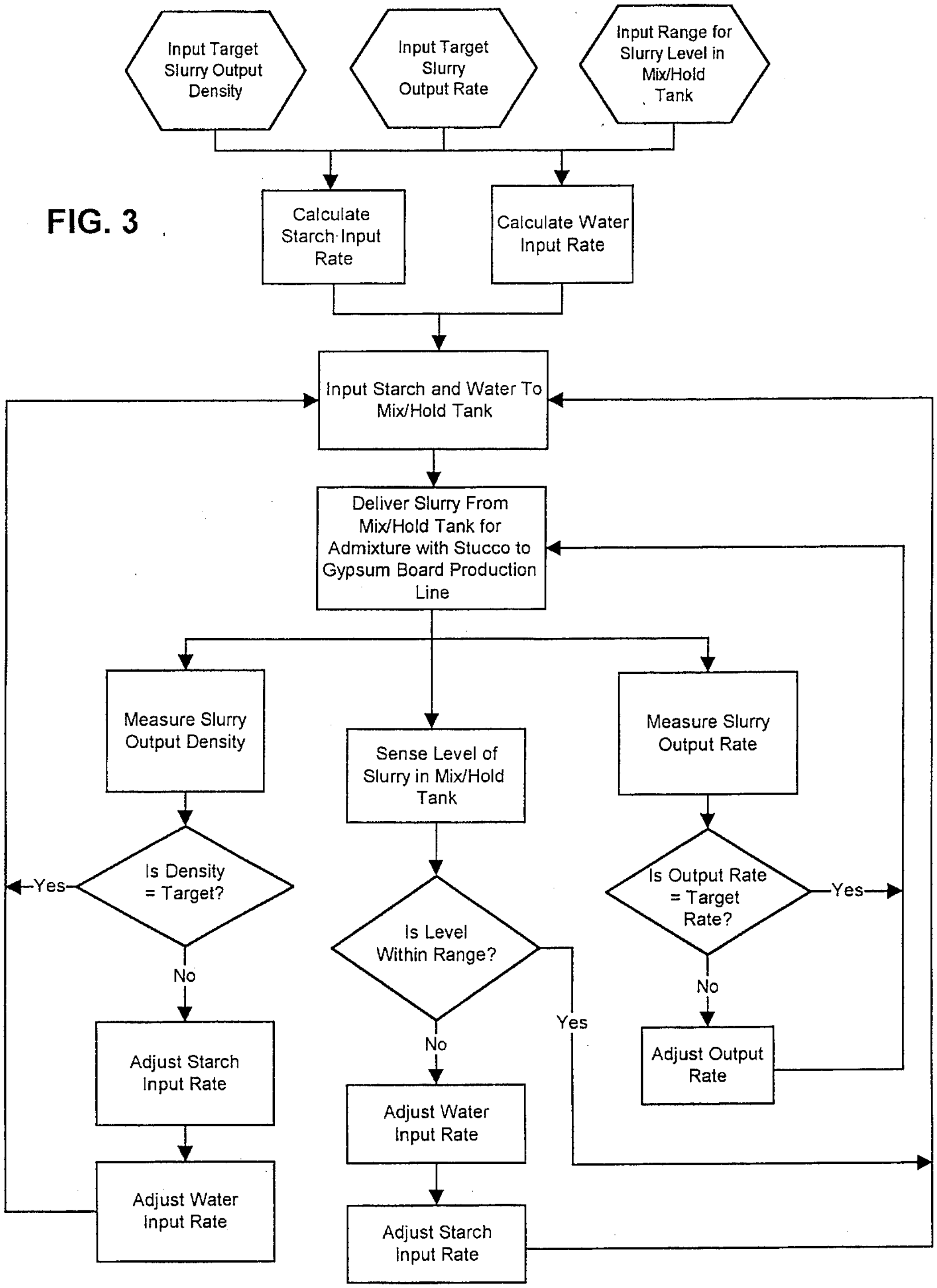
FIG. 3 is a flow chart of the slurry delivery system of the present invention.

The starch input controller 32, the water input controller 38 and the slurry output controller 50 are all controlled by a central programmable logic controller 54 (PLC). Referring also to the flow chart of FIG. 3, the PLC 54 receives a target value for the required slurry output density and rate. These target values are input to the PLC 54 by an operator or by an overall production line process controller and can be manually adjusted by the operator or automatically adjusted by the overall process controller to accommodate production line speed variations that increase or decrease the demand for starch slurry. The PLC 54 converts the target slurry output values to the required water input rate and starch input rate and outputs these values to the water input controller 38 and starch input controller 50, respectively.

The PLC 54 sends a signal to the water input controller 38 of the rate of water input required to meet the needs of the production line 10. The water input Controller 38 also receives a signal from the flowmeter 40 representative of the rate of water flowing through the water supply line 44. The water input controller 38 controls the linear proportional valve 42 to input the desired amount of water to the mix/hold tank 30. Similarly, the starch input controller 32 drives the feeder 28 to input dry starch from the supply hopper 26 to the mix/hold tank 30 based on the signal received from the PLC 54.

The PLC 54 also sends the target slurry output rate to the slurry output controller 50, which drives the pump 46 to output starch slurry from the mix/hold tank 30 for admixture with gypsum and other additives and delivery to the production line 10 based on the signal. The slurry output controller 50 receives a signal from the mass flowmeter 48 of the actual slurry output rate and inputs this value to the PLC 54 for local indication and monitoring. If necessary, the PLC 54 signals the slurry output controller 50 to adjust the slurry output rate to meet the desired target value.

The PLC 54 also receives a signal from the mass flowmeter 48 of the density of the output slurry. The PLC 54 monitors the slurry output density and compares it to the input flow rate of water in relation to the input rate of starch. If the density drops outside of a set range or if the ratio of input water to input starch is incorrect, the PLC 54 will signal the starch input controller 32 to adjust the starch input rate to bring the density back into correct range. If necessary, the PLC 54 also signals the water input controller 38 to adjust the water input rate consistent with the new starch input rate to achieve the target density.

Optimally, the system also comprises a level sensor 56 on the mix/hold tank 30 connected to the PLC 54 to monitor the level of slurry in the mix/hold tank 30. If the level in the mix/hold tank 30 falls outside of an acceptable range, the PLC 54 signals the water input controller 38 to increase or decrease the water flow rate into the mix/hold tank 30. If necessary, the PLC 54 also signals the starch input controller 32 to adjust the starch input rate consistent with the new water input rate to achieve an acceptable level.

A reasonable range of slurry density is required to consistently manufacture quality gypsum board and the PLC 54 chooses a density in the middle of that range as the target value. Slurry density will vary depending on the water solubility of the particular starch used. For example, starch that contains more shells or hulls is less water soluble than a purer starch. However, slurry density will remain constant regardless of the output flow rate and once the solubility of the starch is determined, a target density can be determined. This density is used as the principal process control value to adjust water and starch input rates to meet the starch slurry requirements of the production line.

The mass flowmeter 48 calculates output slurry density some time after the water and starch are input to the mix/hold tank 30 such that the density measurement lags input to the mix/hold tank 30 by the residence time of the starch in the mix/hold tank 30. Depending on the kind and fineness of the particular starch used, the dry starch must interact with the water in the mix/hold tank 30 to hydrate adequately for use in the gypsum slurry (i.e. approximately 10 minutes).

A large mix/hold tank 30 will provide proper hydration but have a longer density measurement lag time, decreasing the accuracy of the water and starch input rate adjustments made for density deviations. Thus, for a large mix/hold tank 30, there is a greater chance that the density of the output slurry will fall outside of the target range. Therefore, the volume of the mix/hold tank 30 should be as small as possible consistent with proper starch hydration and the ability to accommodate production line speed variations which may increase the demand for starch slurry.

A mix/hold tank 30 with a capacity about 1.5 times the volume of slurry used during 10 minutes (i.e. the time needed for proper hydration) of normal operation will ensure adequate hydration. Further, the slurry normally must move some distance from the starch system output pump to the board production line, which provides additional safety time for the starch to hydrate.

Numerous modifications and alternative embodiments of the invention will be apparent to those skilled in the art in view of the foregoing description. Accordingly, this description is to be construed as illustrative only. The details of the structure may be varied substantially without departing from the spirit of the invention, and the exclusive use of all modifications, which are within the scope of the appended claims, is reserved.

It is claimed:

1. A system for delivering a proper proportion of water and starch to form a slurry on a continuous basis responsive to a rate required for the production of gypsum board, comprising:

a starch supply hopper for storage of dry starch;

a mix/hold tank for combining water and starch into a slurry;

a water input controller for delivering water at an adjustable rate to the mix/hold tank;

a starch input controller for delivering starch at an adjustable rate from the hopper to the mix/hold tank;

a slurry output controller for delivering slurry at an adjustable rate and a measurable density from the mix/hold tank to a gypsum board production line; and control means for calculating a difference between an actual slurry output density and a target slurry output density and signalling the starch input controller to adjust the starch input rate to the mix/hold tank based on the difference.

2. The system of claim 1, wherein the control means also signals the water input controller to adjust the water input rate to the mix/hold tank based on the difference.

3. The system of claim 1, wherein the control means calculates a difference between an actual slurry output rate and a target slurry output rate and signals the slurry output controller to adjust the slurry output rate to the gypsum board production line based on the difference.

4. The system of claim 1, wherein the water input controller is connected between a flowmeter and a valve on a water supply line.

5. The system of claim 4, wherein the water imput controller adjusts the rate of water flow through the valve based on signals received from the control means.

6. The system of claim 5, wherein the valve is a linear proportional valve and the water imput controller is a proportional integral derivative controller.

7. The system of claim 1, wherein the starch input controller drives a feeder connected between the starch supply hopper and the mix/hold tank based on signals received from the control means.

8. The system of claim 7, wherein the feeder is a turns-count controlled screw feeder.

9. The system of claim 7, wherein a first scale is connected to the starch supply hopper and a second scale is connected to the input of the feeder.

10. The system of claim 9, wherein the starch input controller is connected between the scales to calculate the rate of starch delivery to the mix/hold tank.

11. The system of claim 7, wherein the starch imput controller is a proportional integral derivative controller.

12. The system of claim 1, wherein the slurry output controller is connected between a pump to deliver slurry from the mix/hold tank to the gypsum board production line and a mass flowmeter to measure the volume and density of the output slurry.

13. The system of claim 12, wherein the slurry output controller drives the pump based on signals received from the control means.

14. The system of claim 13, wherein the pump is a variable speed motor driven pump and the slurry output controller is a proportional integral derivative controller.

15. The system of claim 12, wherein the slurry output controller outputs the volume and density of the slurry delivered to the production line to the control means.

16. The system of claim 1, wherein the control means comprises a programmable logic controller.

17. The system of claim 1, wherein the target density and the target rate of slurry output is input to and stored by the control means.

18. The system of claim 17, wherein the target rate of slurry output is adjustable based on the amount of slurry required for gypsum board production.

19. The system of claim 1, further comprising a level sensor to detect the level of slurry in the mix/hold tank.

20. The system of claim 19, wherein the sensor outputs the level of slurry in the mix/hold tank to the control means.

21. The system of claim 20, wherein the control means signals the water input controller to adjust the water input rate to the mix/hold tank if the level of slurry in mix/hold tank is outside of a predetermined range.

22. The system of claim 21, wherein the control means also signals the starch input controller to adjust the starch input rate to the mix/hold tank consistent with the adjusted water input rate.

23. A system for delivering a proper proportion of water and starch to form a slurry on a continuous basis responsive to a rate required for the production of gypsum board, comprising:

a starch supply hopper for storage of dry starch;

a mix/hold tank for combining water and starch into a slurry;

a water input controller connected between a flowmeter and a valve on a water supply line for delivering water at an adjustable rate to the mix/hold tank;

a starch input controller connected to a feeder on the starch supply hopper for delivering starch at an adjustable rate from the hopper to the mix/hold tank;

a slurry output controller connected between a variable speed motor driven pump and a mass flowmeter for delivering slurry at an adjustable rate and measurable density from the mix/hold tank to a gypsum board production line; and a programmable logic controller for calculating a difference between an actual slurry output density and a target slurry output density and signalling the starch input controller to adjust the starch input rate to the mix/hold tank based on the difference.

24. The system of claim 23, wherein the programmable logic controller also signals the water input controller to adjust the water input rate to the mix/hold tank based on the difference.

25. The system of claim 23, wherein the programmable logic controller calculates a difference between an actual slurry output rate and a target slurry output rate and signals the slurry output controller to adjust the slurry output rate to the gypsum board production line based on the difference.

26. The system of claim 23, further comprising a level sensor for detecting a level of slurry in the mix/hold tank and outputting the slurry level to the programmable logic controller.

27. The system of claim 26, wherein the programmable logic controller signals the water input controller to adjust the water input rate to the mix/hold tank when the level of slurry in the mix/hold tank is outside of a predetermined range.

28. The system of claim 27, wherein the programmable logic controller also signals the starch input controller to adjust the starch input rate to the mix/hold tank consistent with the adjust water input rate.

29. A method for delivering a proper proportion of water and starch to form a slurry on a continuous basis responsive to a rate required for the production of gypsum board, comprising the steps of:

a) inputting a target slurry output density to a controller;

b) calculating a water input rate and a starch input rate to achieve the target slurry output density;

c) inputting water and starch to a mix/hold tank at the calculated water input and starch input rates;

d) outputting slurry from the mix/hold tank to a gypsum board production line at an adjustable slurry output rate and measurable density;

e) comparing the slurry output density to the target slurry output density to produce an error signal; and f) adjusting the starch input rate to the mix/hold tank based on the error signal.

30. The method of claim 29, further including the step, after the starch input rate adjustment of step (f), of adjusting the water input rate to the mix/hold tank based on the error signal.

31. The method of claim 29, further including the step, after the starch input rate adjustment of step (f), of comparing the slurry output rate to a target output rate and adjusting the slurry output rate to the gypsum board production line to equal the target rate.

32. The method of claim 29, further including the step, after the comparison of step (e), of sensing a level of slurry in the mix/hold tank and comparing the level to a target range.

33. The method of claim 32, including adjusting the water input rate to the mix/hold tank if the sensed level in the mix/hold tank is outside of the target range.

34. The method of claim 33, including further adjusting the starch input rate of step (f) consistent with the adjusted water input rate to achieve the desired level.

35. A method for delivering a proper proportion of water and starch to form a slurry on a continuous basis responsive to a rate required for the production of gypsum board, comprising the steps of:

a) inputting a target slurry output density to a controller;

b) calculating an adjustable target slurry output rate based on the rate required for the production of gypsum board;

c) calculating a water input rate and a starch input rate to achieve the target slurry output density;

d) inputting water and starch to a mix/hold tank to a gypsum board production line at an adjustable slurry output rate;

e) delivering a slurry from the mix/hold tank to a gypsum board production line at an adjustable slurry output rate;

f) comparing an actual slurry output rate to the target slurry output rate and adjusting the slurry output rate to equal the target rate;

g) measuring a slurry output density delivered from the mix/hold tank to the gypsum board production line;

h) comparing the slurry output density to the target slurry output density to produce an error signal and adjusting the starch input rate to the mix/hold tank based on the error signal; and i) sensing a level of slurry in the mix/hold tank and comparing the level to a predetermined range and adjusting the water input rate to the mix/hold tank if the slurry level is outside of the predetermined range.

36. The method of claim 35, including further adjusting the water input rate of step (i) consistent with the starch input rate adjustment of step (h) to achieve the target slurry output density.

37. The method of claim 35, including further adjusting the starch input rate to the mix/hold tank consistent with the water input rate adjustment of step (i) to achieve a slurry level in the predetermined range.

* * * * *